…

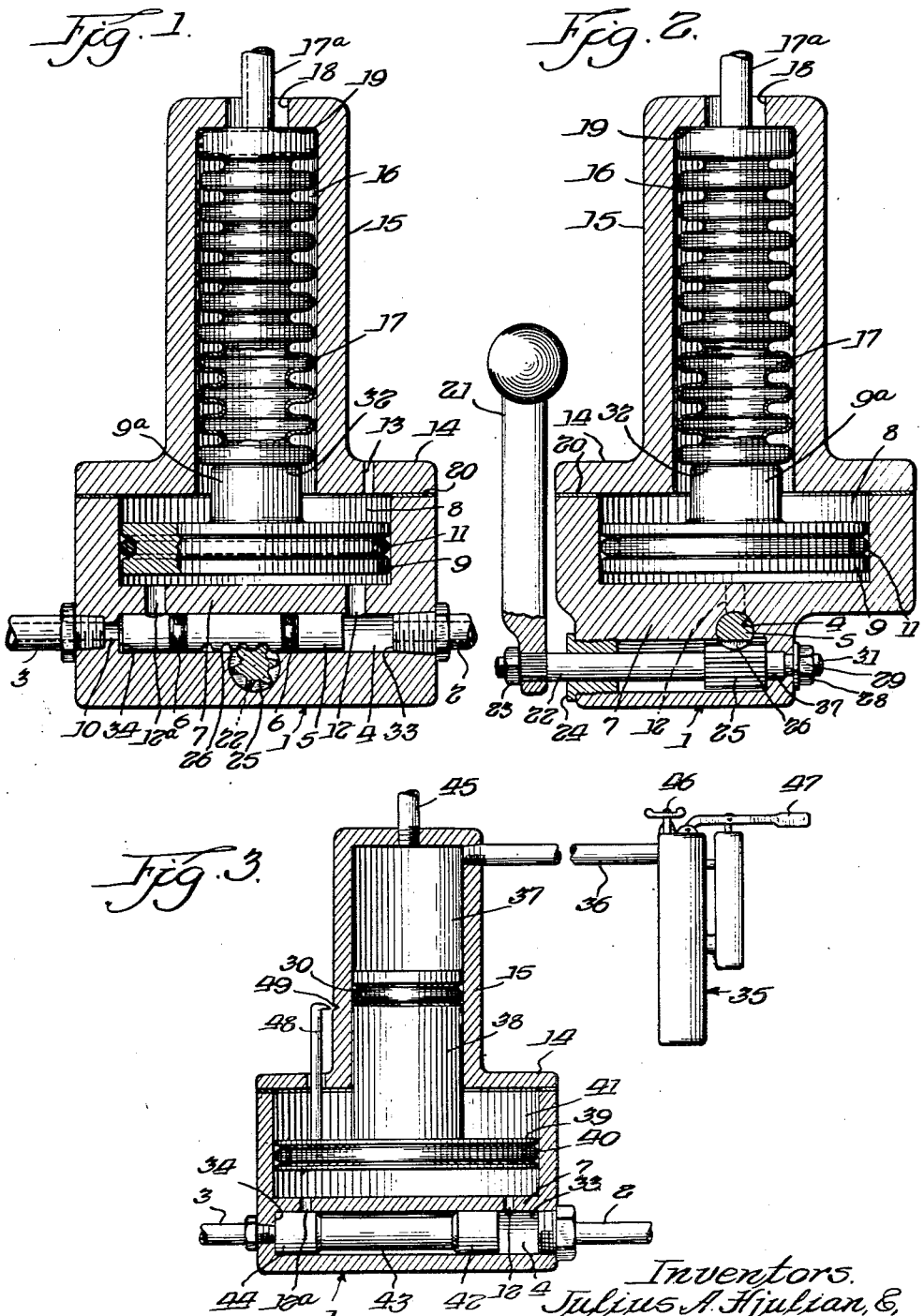

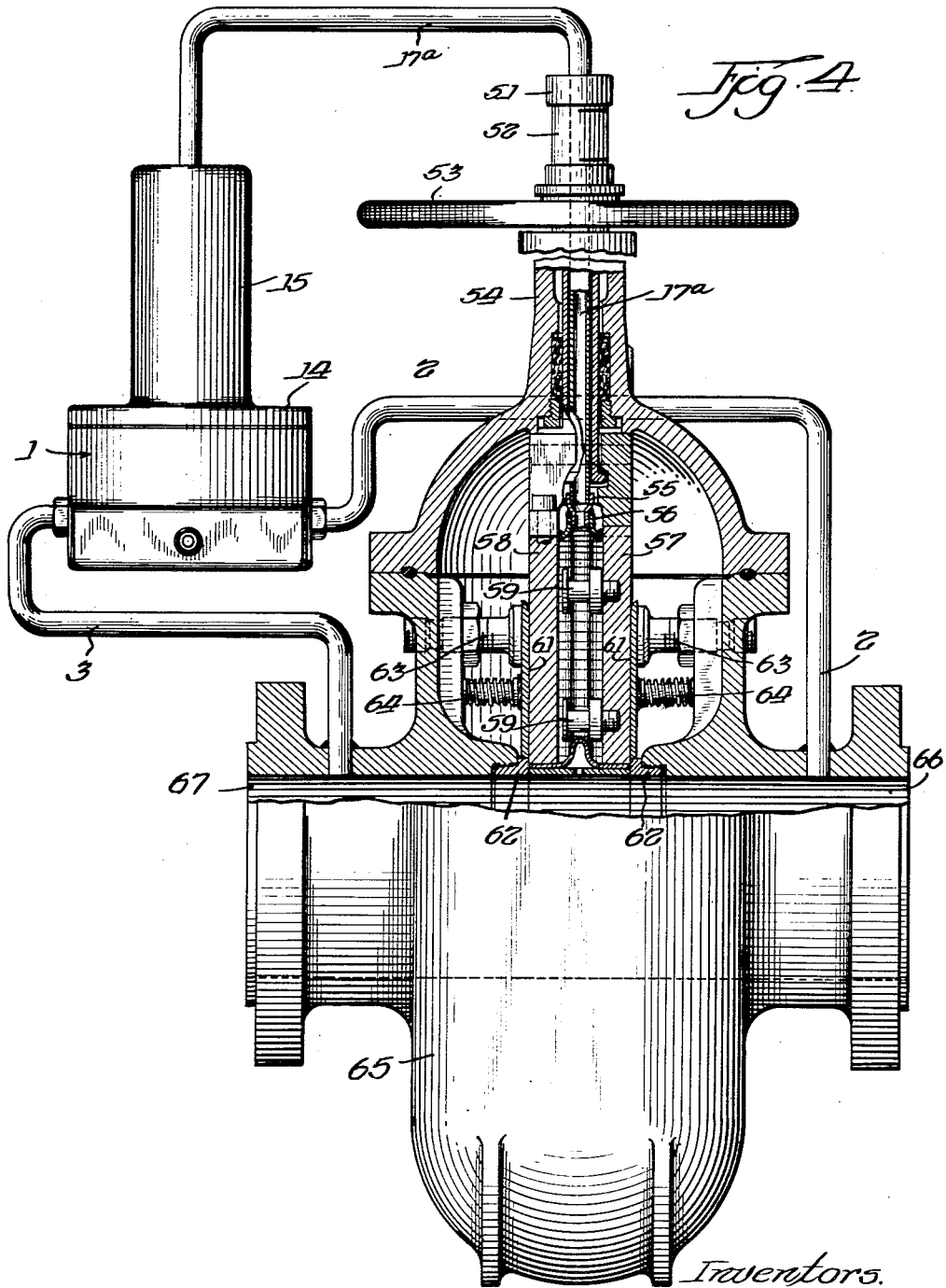

United States Patent Office

2,698,516
Patented Jan. 4, 1955

2,698,516

PRESSURE VALVE REGULATING MEANS

Julius A. Hjulian, Palos Heights, and Frank D. Cotterman, La Grange, Ill., assignors to Crane Co., Chicago, Ill., a corporation of Illinois Application August 7, 1951, Serial No. 240,626

3 Claims. (Cl. 60—54.5)

This invention relates to a pressure valve regulating means, and, more specifically, it is applicable to a pressure valve intensifier or the like.

It has for one of its more important objects the provision of a relatively simple and compact pressure intensifier device to regulate line fluid pressure to pressure responsive or expander means or the like.

A further object is to provide for a structure which is relatively easy to install and maintain as well as to manufacture.

A still further object is to provide for a device in which the relation of parts contributes to the establishment of a durable structure which is positive in operation and comparatively economical to inspect, repair, renew, or replace.

Other objects and advantages will become more readily apparent upon proceeding with the following specification read in light of the accompanying drawings, in which Fig. 1 is a sectional assembly view in a preferred form of our invention.

Fig. 2 is a sectional assembly view of the device in Fig. 1 taken transversely to that shown in the latter figure.

Fig. 3 is a modified form of the invention.

Fig. 4 is a view showing a preferred application to a valve.

Similar reference characters apply to similar parts throughout the several views.

Referring now to Fig. 1, relating to a preferred intensifier assembly, it consists essentially of a substantially cylindrical casing, generally designated 1, which has the inlet 2 which is connected in the usual manner to a high pressure side or line pressure of a pipeline or to the inlet portion of a valve as shown more clearly in Figure 4. At the opposite end of the casing, the outlet 3 is used connected to the low pressure side of the line or similarly, as shown in Fig. 4, to the outlet portion of a valve. The lower part of the intensifier casing 1 is provided with a cylindrical chamber 4 parallel to the central axis of the valve for receiving the reciprocally movable or sliding piston 5. Preferably, although not necessarily, the piston may be fitted with the O-ring 6 for improved sealing. A partition 1 divides the piston chamber 4 from a larger and vertically extending cylindrical chamber 8, within which the vertically movable piston 9 is disposed and which is also preferably provided with the O-ring 11. The piston is provided with an extension portion 9a for reasons hereinafter explained. The lower piston chamber 4 is connected with the fluid outlet 3 by means of the passage 10, while the partition 7 is provided with the vertically extending passages 12 and 12a at each end of the chamber 4 communicating with the chamber 8. The upper end of the chamber 8 is provided with a bleeder venting to atmosphere designated 13 to relieve pressure therein above the piston 9.

In pressure sealing relation to the casing 1, a cover 14 is mounted having an upper wall portion 15 and within which a chamber 16 is provided for receiving the hollow bellows 17, the latter being filled with any suitable fluid for reasons hereinafter explained. The upper end portion of the bellows 17 is provided with an extending tubular portion 17a connected with the interior chamber of the bellows 17 with limits defined by the corrugations or convolutions as indicated. The end portion of the chamber 16 is apertured as at 18, and an abutting connection is made at the shoulder 19 to receive the upper end of the bellows. The projecting tube line 17a in the instant application is connected to an expandable valve closure interior as shown in Fig. 4 and functions for reasons hereinafter explained in more detail.

In order to effect a reciprocating motion to the piston 5 and allow for admission of line fluid into the passage 12 and the chamber 8 by means of a simple and effective method employed, as shown more clearly in Fig. 2. Specifically, a rotatable handle 21 is provided which is connected to a transversely extending stem 22 and is attached thereto by means of the nut 23, the stem being journalled within the threaded bushing 24, mounted in the casing as indicated. Preferably, non-rotatably attached to one end of the rotatable stem 22 is the spur gear 25 and cooperating therewith, as shown in Fig. 1, is the piston 5 which for a portion of its length is provided with a gear rack 26 for engagement with the said gear 25. At the inner extreme end portion of the stem or shaft 22 and beyond the gear 25, the casing is relieved as at 27 to receive an end of the stem as at 27 for journalling the latter member. The reduced end of the stem extends through the casing as at 28 and the stem is held against substantial end movement by means of the nut 29 and the threaded shank 31. Thus, it should be clear that upon suitable pivotal movement of the handle 21, the stem 22 will be rotated thereby to impart a similar rotary motion to the gear 22 which will thereby cause the piston 5 to be reciprocally movable along its rack portion and to an extent and degree depending upon the amount and the direction of rotation of the stem 22.

In actual operation, it will, of course, be understood that line pressure within a pipeline will enter through the intensifier casing inlet 2 and will thus force the sliding piston 5 towards the left thereby to close the orifice 12a, while at the same time exposing the orifice 12. Thus, it will be apparent that movement of the piston 5 will allow the fluid of the pipeline to enter into the larger piston chamber 8, thereby forcing the piston 9 upwardly to compress the bellows 17 and place the fluid inside the bellows under increased pressure which is also transmitted into the tubing 17a and beyond as hereinafter referred to in more detail. It will be realized that the extension portion 9a of the piston 9 will bear against the underside or the lower surface at 32 to cause the base of the bellows 17 to be contacted at its upper end against the shoulder 19.

If the direction of the line fluid pressure should be reversed, the piston 5 will then be forced to the right, thereby closing the orifice 12 and will bear at its opposite end against the surface 33 thereby to close the orifice of the inlet 2 and open the passage 12a, thus allowing fluid flow to pass the seat surface 34 and thereby maintain virtually uninterruptedly the fluid pressure within the bellows 17.

It should be appreciated that in order to release the fluid pressure in the bellows 17, it is merely necessary only that the pressure regulator handle 21 be turned toward the direction of flow, that is, clockwise, and thus force the piston 5 to the right and thus close the orifice in the inlet 2 and the orifice 12. Such actuation of the handle 21 will open the orifice 12a and allow the fluid under pressure to escape through the low pressure side outlet 3 by way of the orifice 12a and into the opening or passage 10.

Thus, it will be clear that a simple and effective means has been provided in a relatively compact manner to maintain the fluid pressure uniform as desired in connection with inflatable members, for example, requiring high pressures and flexibility in performance.

In the latter connection, the modified form of structure shown in Fig. 3 shows a more easily adjustable unit. The casing 1 is provided with the usual inlets and outlets 2 and 3 respectively, but, in this application, the actual operation is facilitated by means of hydraulic regulation in which a hydraulic cylinder or pump, generally designated 35, is employed. The pump 35 is connected by a conduit 36 which communicates with the extension chamber 37, an extension of the chamber 38. The piston 39 sealed by the O-ring 30 is reciprocally movable vertically within the chamber 41. In this modification, the casing 1 similar to the construction in Figs. 1 and 2 is provided with the partition 7 having the usual apertures 12 and 12a which communicate with the piston chamber 4 and within which the piston 42 is reciprocally movable to respond to line fluid pressures. However, in this construction, it will be noted that the piston is made without the actuating means of the gear and rack 25 and 26, respectively. Instead, the piston is preferably reduced, as at 43, to connect the enlarged end portions respectively designated 42 and 44. An outlet from the chamber 37, as at 45, is provided for reasons hereinafter explained.

In actual operation of the instant modified form, in order to release the fluid pressure from within the chamber 37, the conventional by-pass valve 46 normally discharging to atmosphere is opened, allowing the fluid pressure to move into the hydraulic pump 35 as the piston 39 moves upwardly in response to line fluid pressure within the chamber 41. To restore fluid pressure within the chamber 41 to a degree in excess of the line fluid pressure within the chamber 4 of the reciprocally movable piston, the by-pass valve 46 is closed. At this stage, fluid pressure is introduced into chamber 37 by means of the hydraulic pump 35. The pump lever 47 is actuated until the pointer of the dial indicator 48 is brought down to the point marked at the notch at 49. The desired balance of the fluid pressure is thus obtained to effect the result obtained in connection with Figs. 1 and 2.

It will, of course, be clear that the particular intensifier embodiment shown is for purpose of illustration only and may vary substantially from that illustrated.

Considering now for purpose of illustration, a preferred form of application of the intensifier element described in Figs. 1 to 3, inclusive, attention is directed to Fig. 4, in which an assembly is shown whereby the intensifier is installed in connection with a valve of the inflatable disc type, for example, that known as a conduit gate valve.

In this installation, it will be noted that the inlet 2 of the intensifier casing is connected to the inlet portion of the valve, as at 66, while the outlet portion of the intensifier unit is attached to the downstream or outlet end of the valve, as indicated at 67. The upper extension of the intensifier unit being provided with the projecting conduit 17a is integrally connected to the hollow bellows 17. The conduit 17a is extended to enter, as shown in dotted lines, into the top member or coupling connection 51 above the indicated valve top member and having depending below a larger enclosing conduit 52 above the handwheel 53 of the valve. Below the handwheel 53 is the extension 54 of the bonnet enlarged portion connected with the valve casing 65. The conduit 17a continues on into the interior of the inflatable bellows fitting 55, the bellows being hollow and having the annular portion 56 to which it is attached. The valve is provided in the usual manner with an upstream disc 57 and a downstream disc 58, with spacers between for the discs designated 59 are the usual disc guides employed as at 61 with the disc seat rings 62. There are the guide supporting studs 63 and the guide springs 64, all of these elements being above the main casing 65 the usual inlet 66 and the outlet 67.

It will, of course, be understood in connection with the installation on the above described structure that the bellows by its inflation causes the disc halves 57 and 58 to be forced operatively against the valve seat 62 in the closed position of the valve to effect fluid tightness. Where it becomes necessary because of a substantial reversal increase in line fluid pressure to increase the amount of valve sealing power within the bellows proper 56, it is at this stage that the intensifier is applied.

In the manner described, the net result is that the uniformly or constantly applied pressure within the disc halves will cause them to bear more uniformly against the valve seats despite flow reversal or fluctuation.

While a single preferred application of the intensifier has been shown and described, it should, of course, be apparent that many other forms and uses may be employed in which a similar situation arises, namely, the resistance encountered affecting a valve seat or where the abutting contact may change and thereby requires flexible spreading force in the device being used to resist such loads.

We claim:

1. A slide valve intensifier of the character described, the combination of a multi-chambered partitioned-casing having an inlet and an outlet, the partition of said casing extending parallel to the horizontal axis of the said casing, the said chambers being connected by a plurality of passages, a sliding piston in one of the chambers reciprocally moving in horizontal direction between said inlet and outlet, a larger piston in the other chamber movable in a direction transverse to the direction of the first-named piston, the chamber accommodating said larger piston having an extension chamber, a fluid filled hollow bellows in said extension chamber supported by said larger piston leading from the said bellows to a pressure responsive element, the said bellows being collapsible upon upward movement of the said larger piston, one of the said passages being on the inlet side of said casing connected with the said larger piston chamber, the other passage being on the low pressure side of the said casing, the said first-named sliding piston being movable to cover and uncover said passages in the course of its range of movement, the said latter piston having end seat surfaces for contact with casing surfaces adjacent said inlet and outlet and means for effecting said small piston movement.

2. In combination with a sliding piston type of pressure intensifier, fluid conveying means therefor respectively connected to the inlet and outlet of a pressure source, pressure responsive means including a valve closure member positioned between said inlet and outlet, the intensifier comprising a casing connected to said inlet and outlet and with upper and lower cylindrical chambers, the axes of said chambers being in intersecting planes, a horizontal piston of relatively small diameter in the lower chamber, a vertical and substantially large diameter piston in the upper chamber, bleeder means for said upper chamber, a ported partition separating said upper and lower chambers, the lower chamber having its end limits defined substantially by the space between the inlet and outlet to the said casing, a hollow fluid filled bellows movable with said larger piston, an outlet source from the said bellows leading to the interior of the said valve closure member, each of the ports of the partition communicating with the chamber below said large piston, seat means for end surfaces of the said piston adjacent the inlet and outlet of said casing, one of the said ports being positioned adjacent the casing inlet, the other of said partition ports being located adjacent the outlet of said intensifier casing, the horizontal piston being movable therebetween, fluid pressure from the casing inlet moving said smaller piston so as to close the said partition port adjacent the intensifier outlet, the partition port adjacent the casing inlet upon such movement of the small piston being uncovered and communicating directly with the casing inlet, the larger piston moving away from said partition to compress the fluid within the said bellows, whereby if line fluid pressure is reversed the said smaller piston moves to close the partition port adjacent the casing inlet and to open the partition port adjacent the casing outlet thereby to hold the larger piston in the raised position and keep the said bellows in a compressed condition to maintain fluid pressure substantially unchanged in the pressure responsive means.

3. A fluid pressure intensifier of the character described, the combination of a partitioned-casing having a plurality of chambers, an inlet and an outlet, the latter inlet and outlet being disposed at opposite end limits of one of said chambers, the said chambers being connected by spaced-apart passages, a sliding piston in one of the chambers moving in the general direction of fluid flow between said inlet and outlet, a larger piston in the other chamber movable substantially in a direction transverse to the direction of the first-named piston, the chamber accommodating said larger piston having an extension chamber outwardly therefrom, the latter chamber being defined by a shouldered portion at its outer limit, a fluid filled hollow bellows in said extension chamber movable with said larger piston and bearing at one end thereof against the said shouldered portion, an outlet from the said bellows communicating with a pressure responsive element, the said bellows being compressible upon upward movement of the said larger piston to effect fluid flow to actuate the pressure responsive element, one of the said passages being on the high pressure side leading to the said larger piston chamber, the other passage being on the low pressure side of the said casing, the said first-named sliding piston being movable to cover and uncover the said passages in the course of its axial movement between said inlet and outlet.

References Cited in the file of this patent

UNITED STATES PATENTS

| Number | Name | Date |
|---|---|---|
| 862,867 | Eggleston | Aug. 6, 1907 |
| 960,695 | Petro | June 7, 1910 |
| 1,037,031 | Martin | Aug. 27, 1912 |
| 1,730,953 | Stephens | Oct. 8, 1929 |
| 1,888,990 | Kurath | Nov. 29, 1932 |
| 1,976,040 | Scoot | Oct. 9, 1934 |
| 2,354,791 | Boldt | Aug. 1, 1944 |